United States Patent
Slepov et al.

(10) Patent No.: US 8,103,763 B2
(45) Date of Patent: Jan. 24, 2012

(54) SYSTEM FOR REMOTE CONFIGURATION, CONTROL, AND MONITORING OF DEVICES OVER COMPUTER NETWORK USING CENTRAL SERVER

(75) Inventors: Dmitry Slepov, Taipei Hsien (TW); Victor Polyakov, Tver (RU); Vadim Surpin, Tver (RU)

(73) Assignee: Tibbo Technology, Taipei (TW)

( * ) Notice: Subject to any disclaimer, the term of this patent is extended or adjusted under 35 U.S.C. 154(b) by 288 days.

(21) Appl. No.: 12/192,304

(22) Filed: Aug. 15, 2008

(65) Prior Publication Data

US 2009/0055525 A1 Feb. 26, 2009

Related U.S. Application Data

(60) Provisional application No. 60/935,677, filed on Aug. 24, 2007.

(51) Int. Cl.
*G06F 15/16* (2006.01)
(52) U.S. Cl. .......................... 709/224; 709/220; 709/230

(58) Field of Classification Search .......... 709/220–224, 709/230
See application file for complete search history.

(56) References Cited

U.S. PATENT DOCUMENTS

| 6,446,192 B1 | 9/2002 | Narasimhan | |
| 2007/0055698 A1* | 3/2007 | McCoy et al. | 707/104.1 |

* cited by examiner

*Primary Examiner* — David Lazaro
(74) *Attorney, Agent, or Firm* — Andrew C. Aitken (57) ABSTRACT

Devices, systems and methods are disclosed that relate to the control of devices over a network from a central controller. A computer server can control, monitor and affect devices which include a controller and a network interface for communicating information between the device and the server. The device and central controller communicate using a pre-defined communications protocol for either remote configuration, control, or monitoring of the device and the protocol allows the central server to recognize the device as a hierarchical tree of contexts including data elements and metadata describing each said data element.

27 Claims, 8 Drawing Sheets

SYSTEM FOR REMOTE CONFIGURATION, CONTROL, AND MONITORING OF DEVICES OVER COMPUTER NETWORK USING CENTRAL SERVER

CROSS REFERENCE TO RELATED APPLICATION

This application claims the benefit of U.S. Provisional Application No. 60/935,677, filed Aug. 24, 2007, entitled System for Remote Configuration, Control, and Monitoring of Devices Over Computer Network Using Central Server.

FIELD OF THE INVENTION

This invention relates generally to techniques for remote configuration, control, and monitoring of machines, equipment or devices over computer networks. More particularly, it relates to techniques for simultaneous configuration, control, and monitoring of the large number of geographically distributed machines or devices over computer networks from one or more locations.

BACKGROUND ART

There are many types of devices that need to be configured, controlled, and monitored remotely. For example, security, fire alarm, and access control systems have been offering at least some form of interface for remote configuration, control, and monitoring for the past several decades. In some of the early systems this was typically achieved using RS232 or RS485 links. Later, with the advent of local area networks and the Internet, these systems gradually started to take advantage of the "ubiquitous networking" revolution that was and still is unfolding around the world. Thus, dedicated RS232 and RS485 links gave way to direct communications over TCP/IP networks, while the proliferation of HTTP protocol has led to the emergence of a novice form of equipment control using the Internet browser.

Device configuration, control, and monitoring through the Web browser are effected by incorporating into the device necessary circuitry to connect this device to the TCP/IP network, implementing a TCP/IP protocol stack and Web server functionality within the firmware of the device, embedding into the device HTML pages necessary for configuration, control, and monitoring of the device, and providing a so-called common gateway interface (CGI) to allow the inclusion of dynamic data into the HTML pages output by the Web server of the device. This dynamic data may carry information about present device configuration, mode of operation, state, or any other useful information. The CGI interface can also be used to send to the device commands to change the configuration of the device or perform some other useful function.

Over-the-network configuration, control, and monitoring of such Web-enabled device may be achieved without installing any specialized software on the client machine. The user simply opens a standard Web browser, types in the address of the device and interacts with the device through the HTML pages "served" by the internal Web server of the device.

There are numerous variations on the above concept.

For example, U.S. Pat. No 6,446,192 (the "'192 Patent") discloses a single integrated circuit chip that interfaces device control circuitry of a device to a client machine via a computer network. The chip implements complete internet protocol functionality. The chip also translates the information between network protocol formats and a format of the device. According to the preferred embodiment of the invention disclosed in the '192 Patent, the chip sends to the client machine software comprising bytecode instructions (e.g. Java bytecode applet) executable by an interpreter running on the client machine (e.g. a Web browser with a Java Virtual Machine). Executing these instructions on the client machine creates a virtual interface to the device. Thus, the use of the HTML pages for accessing and altering the configuration of the device is complemented and augmented by the creation of the virtual interface.

Convenient as it may seem, device configuration through a Web browser has significant limitations. Namely, configuration, control, and monitoring of each such device incorporating its own Web server cannot be combined with configuration, control, and monitoring of another device, even if both devices are absolutely identical in nature. Working as a Web server, each device sends its own HTML pages, thus requiring the user to open a separate Web browser window for each device being accessed or, alternatively, access each device one-by-one. Certain systems may include hundreds, even thousands of devices and configuring them by accessing HTML pages separately on each device may become arduous and impractical.

One more disadvantage of the above method is that it requires uninterrupted connection to the device being configured, controlled, or monitored. Meeting this requirement when both the device and the client computer are connected to a small local-area network is trivial. Achieving the same for multiple devices distributed over the Internet is much more difficult.

Additionally, the reliability and availability of the data link to the device are typically adversely affected when the device is connected to the network through a wireless link (for example, a Wi-Fi connection) and the device itself is not stationary. This is the case for mobile terminals, portable data collecting equipment, hand-held computers and all other portable devices whose very nature dictates that these devices are constantly "on the move". It is not practical to create a system for remote communications with such devices on the premise that uninterruptible connection to each device will be available at any time. In fact, in many instances a "window of opportunity" for accessing and configuring the device will be smaller than the time required to complete a desired transaction. That is, the breakdown of the established data link may occur before the configuration, control, or monitoring task is completed.

One more disadvantage of the above method is that accessing the device over the network from the client machine requires this device to have a static IP address. If the device is being accessed over the Internet, its IP address must also be "real" i.e. accessible from any point of the network. Such IP addresses are obtained from Internet Service Providers (ISPs), and consequently, there is a cost associated with obtaining and using them. Having multiple geographically distributed devices requires that each device is assigned its own static real IP address. Combined costs and management overhead associated with maintaining a real IP address and proper firewall setup for each device may be substantial.

Yet another disadvantage of the above method is that it creates significant management overhead due to the necessity of configuring a firewall on each device's site. In most installations, the device will be connected to the Internet through an ADSL link. This connection will usually be effected through an ADSL modem with built-in firewall function. The modem creates a firewall-protected private network and the device is connected to this network. Very often, the device will share this private network with personal computers and other devices.

A problem with the network configuration, as discussed above, is that while connecting from within the private network to a server outside does not require any setup on the firewall, connecting from outside of the private network to the device connected to the private network requires proper firewall setup, such as arranging "port forwarding" or "IP forwarding". In a system that includes multiple devices on multiple firewall-protected private networks, the firewall setup creates a significant management overhead, not to mention the human factor: many IT departments view this kind of "opening" the network as potential vulnerability to external attacks and are not willing to compromise their networks in this way.

Finally, some kinds of connections to the Internet do not allow incoming connections in principle. For example, cellular networks, such as GPRS, will only allow the device to connect to the server on the Internet, and not the other way around.

For the above reasons, various large-scale systems consisting of a number of devices (nodes) rarely utilize the form of Web browser-based configuration, control, and monitoring described above. Rather, they typically rely on the intermediary system, such as a computer server running specialized software or purpose-designed hardware board, which acts as a central depository of data as well as the main coordinator of the system.

With this intermediary approach, the user is typically able to simultaneously control, configure, and monitor all or several devices in the system without having to perform repetitive operations on each device. For example, the system may be designed in such a way that giving a specific command to the central server will result in similar commands being sent by the server to each device (node) in the system. Conversely, events registered by individual devices are collected by the central server and stored in a single database thus offering the user a convenience of viewing all events in one place.

Such systems have a disadvantage of a very high cost of the design of specialized central server software or hardware board. Communications between the central server and the devices are usually based on a proprietary protocol designed specifically for each particular system. Typically, the central server software is inflexible and requires exact match between the devices and the central software for the system to work correctly. As a result, even a small change in the design of devices necessitates a corresponding change to the central server software. This results in high costs of maintaining the system.

Additionally, introducing different, previously unsupported devices into the system becomes a task akin to designing new central server software. For this reason, many systems of this class remain closed, non-expandable, and proprietary to this day.

Example: Vehicle Monitoring System

As an example, consider a vehicle monitoring system managing a fleet of cars, trucks, forklifts, or other vehicles. Each vehicle in the fleet is outfitted with a hardware device that collects a variety of data on the driver's behavior. This data includes driving speed, maximum acceleration and shocks experienced by the vehicle, driving patterns such as the amount of time spent driving vs. the amount of time spend idling. All this data is logged into the device's memory for later upload to the computer, typically through some form of a wireless interface. The device also works as an access controller for the vehicle—drivers use access codes or RFID cards to "log on" to the vehicle. This improves security and safety, the latter due to the ability of the system to disallow drivers not trained for a particular vehicle category. Driver's access to the vehicle can also be a subject to time limitations, such as "only within predefined shift", "only within standard working time", etc. Moreover, all vehicle log-ins and log-outs are recorded. In combination with vehicle driving patter records, this creates an extensive audit trail. The system can also perform a number of additional functions such as monitoring oil and gas level, battery charge, etc. In critical situations, the vehicle can be remotely immobilized by a command sent through the wireless interface. For example, airport facilities increasingly require remote deactivation capability for all ground vehicles as a form of gaining control over vehicles entering restricted areas such as runways.

Wireless connection to devices installed on the vehicles may be used to upload onto the device a list of parameters such as "maximum permitted driving speed" and "maximum permitted acceleration"; a well as a list of driver codes and permissions. The same wireless connection is used to download from the device an event log containing the history of log ins, log outs, as well as other events such as "engine started", "engine shut off", "excessive speed detected", etc.

Vehicle monitoring systems suffer from a number of problems discussed above. Wireless connection to each vehicle is typically unstable. Even on a site that has blanket wireless coverage there are always situations and areas where the connection is unstable or unavailable. In a lot of cases, vehicles are also not confined to a particular site and only return to the base occasionally. This dramatically narrows the window of opportunity for communicating with any particular monitoring device.

An average fleet can include many different types of vehicles, and these different types may require different setup. Additionally, the vehicles are typically outfitted with the monitoring device at different times. As a result, some carry older monitoring devices, some carry newer ones, and the versions of monitoring device firmware may not be the same on all vehicles. In a regular working environment, it is next to impossible to collect all vehicles and update their devices and firmware simultaneously. Very often, some monitoring devices will receive an upgrade. For this upgrade to work, the PC software collecting the data from these vehicles will have to be upgraded too. This, in turn, will make it incompatible with older versions of monitoring devices still working on some vehicles. Experience shows that this cycle of update problems can be endless.

OBJECT AND ADVANTAGES OF THE INVENTION

In view of the above, it is an object of the present invention to provide an improved system for providing simultaneous remote configuration, controlling, and monitoring of the large number of geographically distributed and disparate machines or devices over computer network from one or several locations. In particular, it is an object of the present invention to significantly reduce the complexity and cost of work associated with the development of the server and client software. It is another object of the invention to provide a solution for inexpensive and fast combining into a single system of devices of different type. It is yet another object of the invention to provide a system for controlling devices that have unstable or periodic connection to the network and the server. Finally, it is yet another object of this invention to reduce the cost of maintaining a data connection to each device in the system. Other objects and advantages of the invention will become evident from consideration of the following description and associated drawings.

SUMMARY OF THE INVENTION

The present invention provides an improved system for simultaneous configuration, control, and monitoring of the large number of geographically distributed and disparate machines or devices over computer networks from one or more locations using a central server and one or more instances of client software.

Examples of such machines and devices include but are not limited to:

building and site security devices such as access control panels, safety devices such as fire alarm panels, building automation devices, such as HVAC (heating, ventilation, and air-conditioning) controllers, vending machines, remotely controlled vehicle monitoring systems, remotely controlled data acquisition systems such as weather stations, stationary data entry and collection devices such as factory floor automation terminals and time recorders, also known as time and attendance terminals, and mobile data collection devices such as hand-held warehouse data terminals, credit card terminals, and order data processing terminals.

In the system of the present invention, the server works as a central coordinating element, as well as a central depository of data. Client software is used to work with the system.

The central server can be implemented as a software program running on a computer server, or as a purpose-built hardware appliance. This distinction makes no difference for the purpose of explaining the present invention and the terms "server" and "central server" will equally apply both to the software program running on the computer server, and the purpose-built hardware appliance. Additionally, the term "server" will refer either to the client software itself, or the client software in combination with the hardware on which it is executed.

The client software can be implemented as a standalone software program, browser-based application that runs inside the Web browser, or a purpose-built hardware appliance. This distinction makes no difference for the purpose of explaining the present invention and the term "client" will equally apply to standalone client software program, Web browser-based client application, and the purpose-built hardware appliance. Additionally, the term "client" will refer either to the client software itself, or the client software in combination with the computer or other device on which this software runs.

In contrast with prior solutions that either require repetitive individual configuration of each device, or rely on proprietary closed systems designed to support specific devices whose hardware and firmware must match exactly to what the central server software expects, the present invention offers a unifying platform that allows the user to combine devices of different types into a single system without the need for extensive programming or development effort on the server and client software side.

The system of the present invention comprises an abstract data model representing each device as a hierarchical structure of contexts. Each context includes a set of formalized data elements. Each data element can be of a property, method, or event type. The context also contains metadata that describes the data elements available in this context. Additionally, the metadata includes the list of all child contexts of the current context. Thus, the data elements and the metadata of each context are stored entirely within the device.

Those skilled in the art will immediately recognize the parallel with object-oriented programming, where objects typically contain properties, events, and methods. In a summary, properties are internal variables of the device, methods are operations that the device can perform, and events are a way for the device to notify the server of detected changes in the internal or external operating conditions.

Virtually any device designed to perform a function can be described as a set of properties, methods, and events. For example, a smart remotely-controlled water tank can have a property "water level" to reflect current amount of water in the tank, and methods "turn valve on" and "turn valve off" to control the valve that lets the water into the tank. The smart water tank may also generate a number of events such as "nearly empty", "nearly full", and "overflow".

The system of the present invention further comprises a communications protocol that allows the server to intelligently access, manipulate and process the data elements and the metadata of each device connected to the system.

In combination, the object-based representation of devices and the communications protocol provide a foundation for a system that automatically learns about the specifics of each connected device, even if this device has connected to the system for the first time. As a result, the cost and complexity of implementing the support for new devices in the system are greatly reduced.

Additionally, the present invention further comprises a system in which the server stores a copy of data elements of each device, and the instances of the client software interact only with the copies of the data elements stored on the server, and never directly with the data elements of the devices. The server, in its turn, synchronizes its own local copies of the data elements with the data elements of devices. Synchronization is made on a "best effort" basis, i.e. at the earliest opportunity when the device becomes online and connects to the server. Thus, the system of the present invention solves the problem of remote configuration, control and monitoring of devices with unstable availability.

Since the synchronized copies of device data elements are stored on the server, so called "group operations" become possible. Group operations represent one of the strongest aspects of the system of the present invention as they spare the user from the necessity to configure and control each device separately. Group operations involve making simultaneous changes to the copies of data elements of several devices. For example, several devices in a system can be combined into a group in which a change made to a copy of the data element of any device is automatically repeated for the corresponding elements of all other devices in the group. Moreover, group operations can be performed on devices that are not fully identical. For example, there may be a difference in the set of data elements of devices caused by different firmware versions these devices are running. In each such case the server will perform the operation on a "best-effort" basis, i.e. try to match the elements of one device to the data elements of another device.

The use of the central server has other benefits, such as: centralized user management, coordinated authentication and authorization of devices and instances of client software, correct handling of events generated by devices located in different time zones, and other benefits that will be immediately apparent to those skilled in the art.

Further, in contrast to the Web browser based configuration, control, and monitoring method described above, the system of the present invention relies on devices that establish outgoing connections to the server. Where the Web based configuration requires a real IP address to be assigned to each device for this device to be accessible over the network, the system of the present invention only requires a single real IP address—for the server. All devices in the system establish an outgoing connection to the server. This eliminates the necessity to configure firewalls on each device's side, and also allows interaction with devices on cellular networks, such as GPRS, which only allow outgoing connections.

In a preferred embodiment of the invention, the server and client portions of the system are implemented as JAVA software running under any Java-enabled operating system. This opens the possibility to run the server portion of the system on various platforms, such as Microsoft Windows, Linux, FreeBSD, or any other operating system for which a port of JAVA virtual machine exists. The same equally applies to the client software portion of the system, but in case of the client the list of potentially supported platforms and operating systems is even wider and includes devices such as PDAs and smartphones, for which a special version of the client software can be created. As stated before, the client may be realized as a standalone software or Web browser-based application. The Web browser-based client uses a modern interactive technology, such as AJAX, to make the browser-based application look and feel like standalone software program.

Vehicle Monitoring System Example Revisited

When implemented as a system of the present invention, the vehicle monitoring system is freed from all limitations described above. Synchronization of data between the devices and the server will be performed each time the connection is available. The user can make changes to the configuration of the vehicle and user permissions at any time, not just when the vehicle is on site and the wireless connection to this vehicle is available. Actual changes to the configuration of the vehicle's monitoring device are made as soon as it connects to the server. In a similar fashion, the user can review the list of events on the server at any time. Each time a particular vehicle's monitoring device connects to the server, newly queued events are uploaded from the device onto the server. Various vehicles in the fleet can also carry different versions of the monitoring device and still be managed as a group, thus dramatically reducing management overhead per vehicle. Finally, since the monitoring devices on vehicles connect to the server and not the other way around, these devices do not need a real static IP and can utilize any kind of a wireless connection, including GPRS, etc.

It will be obvious to those skilled in the art that the system of the present invention can equally be applied to other machines, devices, and applications as well. The aforementioned and other advantages of the invention will become apparent from the following description and accompanying drawings.

DETAILED DESCRIPTION

Although the following detailed description contains many specifics for the purpose of illustration, anyone with ordinary skill in the art will appreciate that many variations and alterations to the following details are within the scope of this invention. Accordingly, the following preferred embodiments of the invention are set forth without any loss of generality to, and without imposing limitations upon, the claimed invention.

The System

Figure 1:
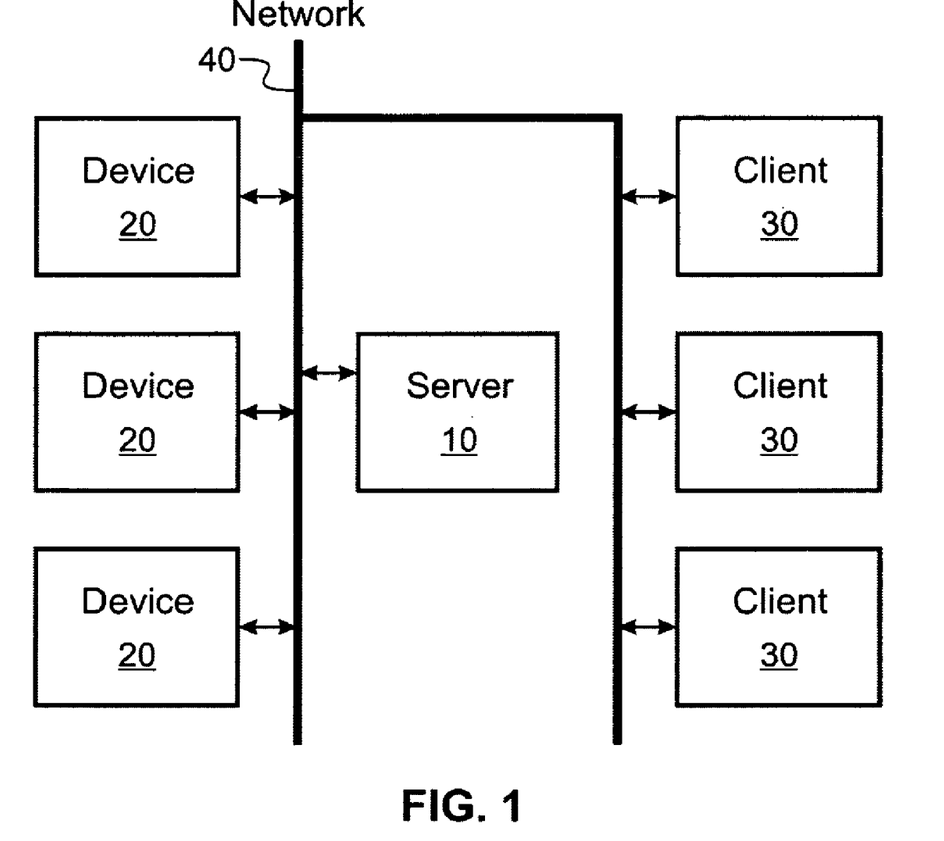
FIG. 1 is a schematic representation of the system according to a preferred embodiment of the invention.

A general block diagram of the system according to a preferred embodiment of the invention is shown on FIG. 1. The system comprises a central server 10, one or more devices 20, and one or more clients 30. The server 10, devices 20, and clients 30 are connected to the TCP/IP network 40.

The central server 10 comprises a JAVA application running on a computing platform that offers JAVA virtual machine for execution of the said JAVA application. This computing platform can be of any hardware type, and use Microsoft Windows, Linux, FreeBSD, or any other suitable operating system (OS). In an alternative embodiment of the invention, the role of the server 10 is played by a purpose-built appliance implementing the functionality of the server 10 through a combination of hardware and software.

The server 10 is the only component of the system that attempts to stay online and connected to the network permanently.

Devices 20 may use a wired or wireless connection to the network, such as WiFi, GPRS, or any other suitable wireless communications media. Some devices 20 may be permanently connected to the network, while some may only connect to the network periodically. For example, devices 20 may be configured to only turn themselves on at predefined time intervals or connect to the network when they detect an event that needs to be reported to the server 10. Unstable connection of other devices 20 to the network may be caused by inherent unreliability of communications media being used. For example, WiFi and GPRS networks do not guarantee a constant connection to the network.

The client 30 comprises a JAVA application running on a computer that offers JAVA virtual machine for the execution of the said application. The client 30 may be realized as standalone software or Web browser-based application. To enhance user experience, the Web browser-based application can use a modern interactive technology, such as AJAX, to make the browser-based application look and feel like standalone software program. The computer executing the client software may be of any hardware type. It may be a desktop or portable personal computer, PDA, smartphone, or any other suitable device. This hardware may use Microsoft Windows, Linux, FreeBSD, or any other suitable operating system including operating systems for PDAs and smartphones. Lightweight simplified client software may be designed specifically for use on PDAs, smartphones, and other compact devices. In an alternative embodiment of the invention, the role of the client 30 is played by a purpose-built "appliance" implementing the functionality of the client software 30 through the combination of hardware and software, possibly without relying on any operating system.

The clients 30 do not need to be permanently connected to the network for the system to function properly.

The network 40 may be a local-area network, wide-area network, or the Internet. Different segments of the network may use different communications media, such as Ethernet, WiFi, GPRS, or any other suitable media that is available now or will be available in the future.

Hierarchical Model

In the system of the present invention each device is represented as an abstract model consisting of a hierarchical structure of contexts, known as context tree. This structure is shown on FIG. 2. At the top of the context tree 60 there is a root context 50. Root context 50 has child contexts 70. Any child context 70 can have its own child contexts 80, and so on.

Figure 3:
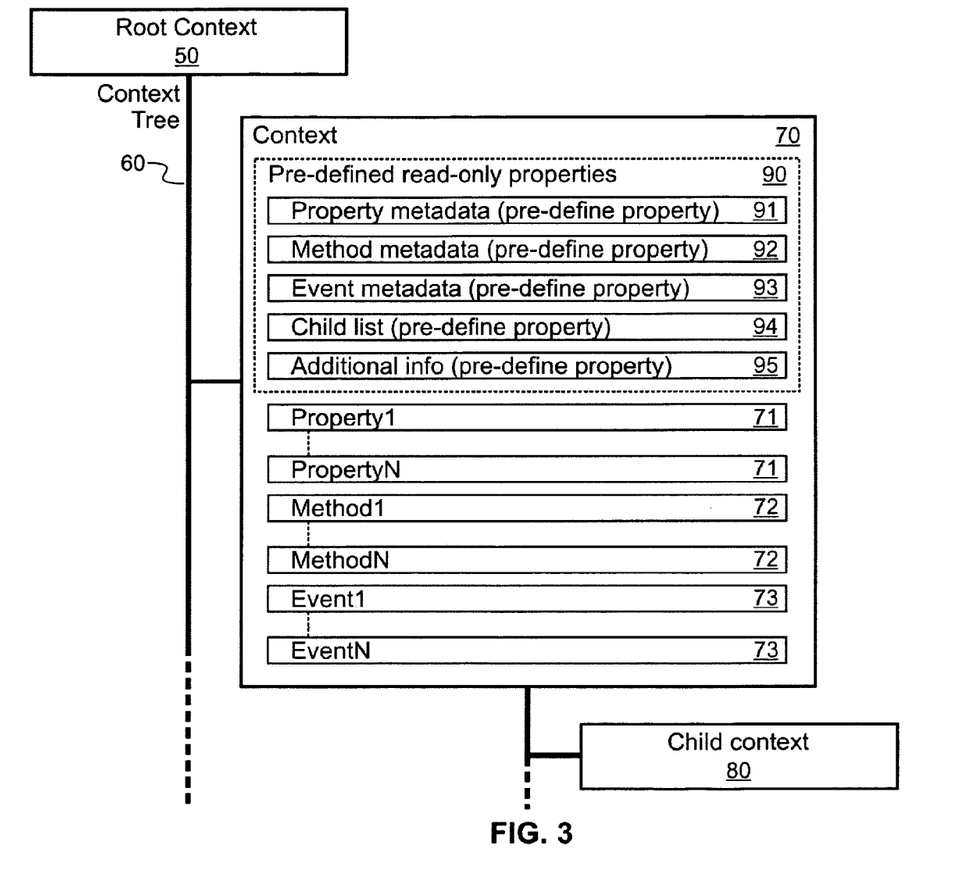
FIG. 3 is a schematic illustration of detail of one context from the context tree according to the invention.

Contents of one particular context are shown on FIG. 3. All other contexts are similar to the one shown. The context includes data elements of three types: property data elements 71, method data elements 72, and event data elements 73.

Property data elements 71 are used for viewing or editing context-specific data and configuring a corresponding functional part of the underlying device. Thus, property data elements 71 provide access to internal variables of the device that guide and/or reflect device operation, mode, state, and other parameters. This access is provided through the value of the property. It can be said that the property contains or stores this value. Additionally, the property stores the time and date of the last change made to the value of this property—from inside the device or by the server.

Method data elements 72 are used for executing context-related operations and provide a way to make the device perform specific operation. Each method data element 72 references this method's implementation in code. It may be said that the method "contains" the code, and depending on the actual device design, this may or may not be technically true.

Event data elements 73 are used for monitoring the state of the context and a correspondent functional part of an underlying device. Thus, event data elements 73 provide a way to make the device respond to the change in particular internal or external operating conditions of this device and express this change in the event notification. Event notifications are first queued on the device. Queued notifications are sent to the server on the "best effort" basis, i.e. at the earliest possible opportunity.

Each method data element 73 comprises a method definition, i.e. the metadata describing this method, and method implementation in executable code. Event elements also reference or "contain" executable code that is used to generate corresponding event notifications.

Values of the property elements 71, as well as input and output values of method elements 72 and data associated with event elements 73 are represented in a form of structures called data tables. Every data table consists of a format descriptor and zero or more records containing the data itself. Format descriptor of a data table defines types, names and descriptions of columns, minimum and maximum number of records, rules for data validation, rules for visual presentation and editing of data and data binding expressions used to change values of the table cells depending on the values of other cells.

As was stated before, each context also stores the metadata. This metadata is stored in the form of five special pre-defined read-only properties 90. Each context must include these properties and the server will expect to find them within each context.

The first special pre-defined read-only property 91 stores the data on available property elements. The value of the property 91 comprises a data table that contains a definition of every property 71 of the context. Property definition comprises the following parts: property name, property format descriptor, various flags (such as "readable" and "writeable"), detailed write and read permissions, property description, and group affiliation. The property definition may also include, when applicable, a custom code that executes when the property is being read or written.

The second special pre-defined property 92 stores the data on available method elements. The value of the property comprises a data table that contains a definition of every method 72 of the context. Method definition comprises the following parts: method name, format descriptor for input and output data, detailed invocation permissions, method description, and group affiliation.

The third special pre-defined property 93 stores the data on available event elements. The value of the property comprises a data table that contains a definition of every event of the context. Event definition comprises the following parts: event name, format descriptor for the data associated with every event notification, event description, event permissions expressing who can receive event notification for this event, expiration time indicating for how long a particular event notification should be stored, severity level providing rough event classification according to its importance, and group affiliation.

Figure 2:
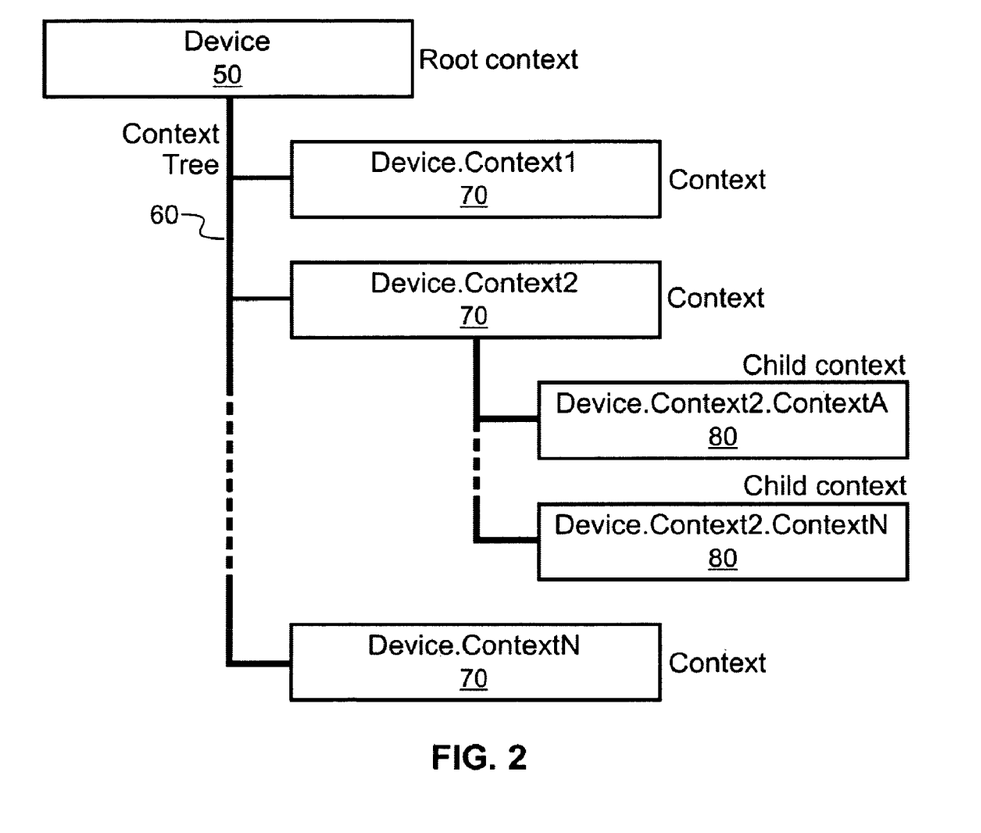
FIG. 2 is a schematic illustration of a context tree according to the invention.

The fourth special pre-defined property 94 stores a data table that lists all child contexts of the current context. This data makes it possible to start at the topmost "root" context 50 and walk through entire context tree 60.

The fifth special pre-defined property 95 stores additional data such as context description and any other useful information.

Communications Protocol

Communications between the server and devices are effected through a special communications protocol.

There are several ways in which the support for the said communications protocol may be incorporated into the device.

In a preferred embodiment of the invention, shown in FIG. 1, device 20 natively supports the interaction with the server 10. Such device does not require additional external or internal hardware, or external software plugin, for communications with the server 10, as all necessary hardware circuits as well as firmware support, are already implemented in device 20.

Figure 4A:
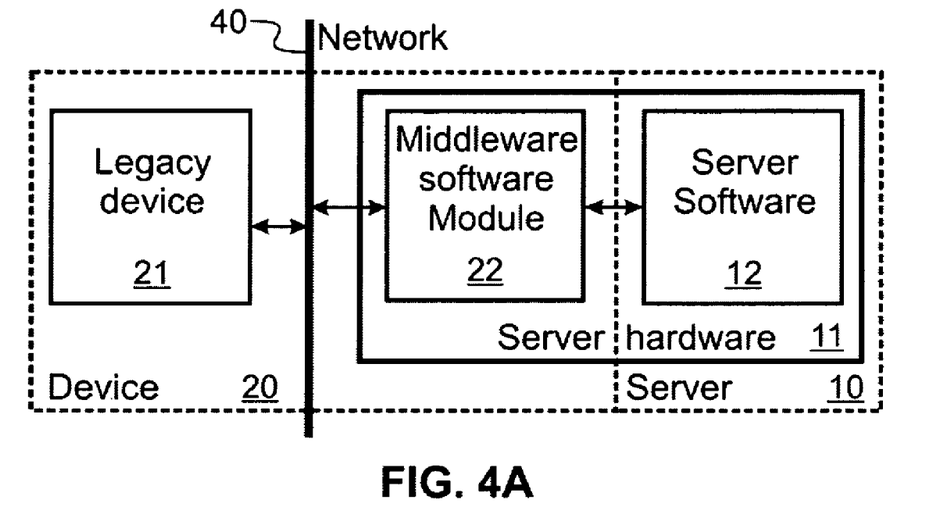
FIG. 4A is a schematic representation of an alternative embodiment of a portion of the invention using a software middleware module.

In another embodiment of the present invention, shown in FIG. 4A, a special middleware software plugin module 22, that transforms between the native protocol of the legacy device 21 being connected to the server 10 and the protocol of the server 10 is created. This plugin 22 may run on the same server hardware 11 as the server software 12, but is logically associated with legacy device 21. For the purpose of the following discussion, legacy device 21 and the middleware software plugin module 22 form the device 20.

Figure 4B:
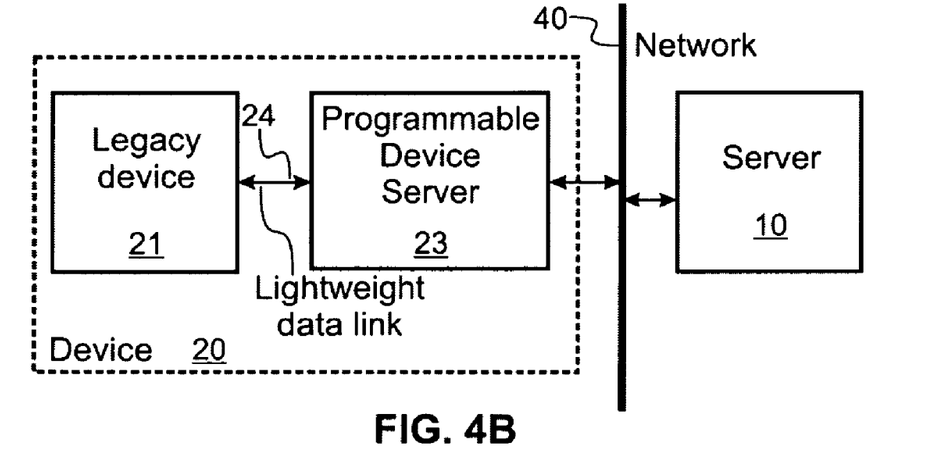
FIG. 4B is a schematic representation of an alternative embodiment of a portion of the invention using an external device server connected to a legacy device.

In a further embodiment of the invention, shown in FIG. 4B, the communications protocol is implemented in a programmable device server 23 that is physically separate from a legacy device 21 and connected to the legacy device 21 by a lightweight data link 24. For example, this link 24 may be of RS232 type. Programmable device server 23 executes a program that converts between the native protocol of the legacy device 21 being connected to the server 10 and the protocol of the server 10.

Figure 4C:
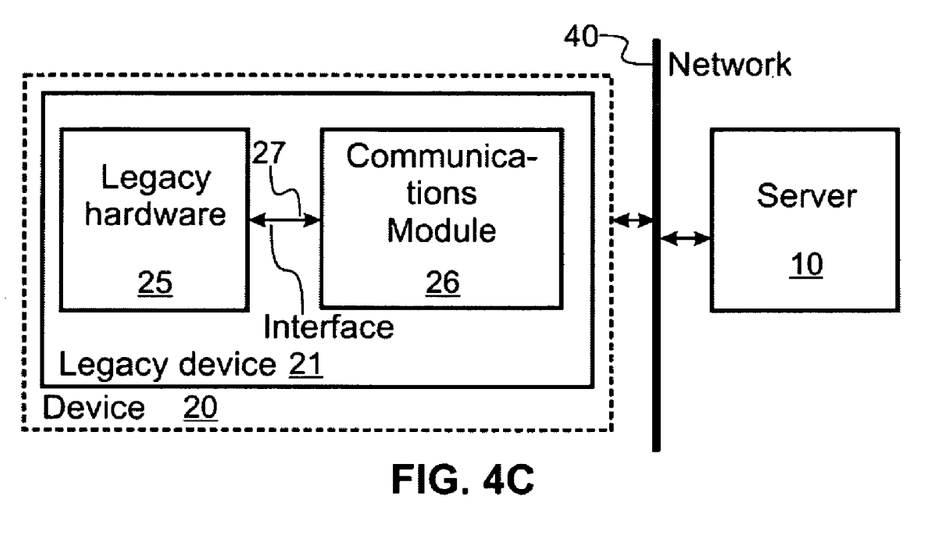
FIG. 4C is a schematic representation of yet another alternative embodiment of a portion of the invention using a device server module built into a legacy device.

Yet another embodiment of the present invention, shown in FIG. 4C, anticipates the use of a special communications module 26 built into the legacy device 21 in order to make it compatible with the system. This communications module 26 performs necessary conversion between the native protocol of the legacy hardware 25 and the protocol of the server 10. The communications module 26 may communicate with the legacy hardware 25 through any kind of internal interface 27. This interface may be of parallel, serial, or any other suitable type. In case the legacy hardware 25 does not have its own processor, the interface 27 may comprise a set of input-output hardware lines.

In the following description of the system the term "device" will refer equally to devices that natively support communications with the server, as well as legacy devices that rely on the additional middleware software module, external programmable device server, or built-in communications module for communications with the server. For the purpose of the following discussion, the combination of the legacy device with the middleware software module, external device server, or internal communication module will be referred to as the "device".

Communications Protocol Details

According to a preferred embodiment of the invention, communications between the device and the server are performed through a single, optionally secure, TCP connection. In the process of communications, the server and the device exchange packets. Each packet is a logical unit of information. The server sends to the device command packets and the device replies with reply packets. Additionally, the device generates and sends to the server event packets, which do not require any reply from the server.

A packet format according to the preferred embodiment of the invention is shown below.

| <STX> | COMMAND_PAYLOAD | <CR> |
|---|---|---|

According to the preferred embodiment of the invention, each packet starts with <STX> (ASCII code 0x02 Hex) character and ends with <CR> (ASCII code 0x0D Hex) character. Characters between the <STX> and the <CR> form the payload of the packet. All characters outside of the <STX> and the <CR> are ignored. Incomplete packets such as those containing <STX>, some payload data, but no <CR>, are also ignored. Discussion below omits <STX> and <CR> characters for clarity.

Command payload format according to the preferred embodiment of the invention is shown below.

| M/FIELD_1/.../FIELD_N |
|---|

According to the preferred embodiment of the invention, each packet starts with a packet code optionally followed by one or more fields. The packet code and each parameter are separated from each other by a character with ASCII code 0x17 Hex. This character will be referred to as "separator". Since the ASCII code 0x17 is unprintable, for the purpose of illustrating the protocol the following discussion will use "/" character in place of actual separator. In the following discussion, packet formats are represented in a simplified form with certain fields omitted for the sake of clarity.

Figure 5:
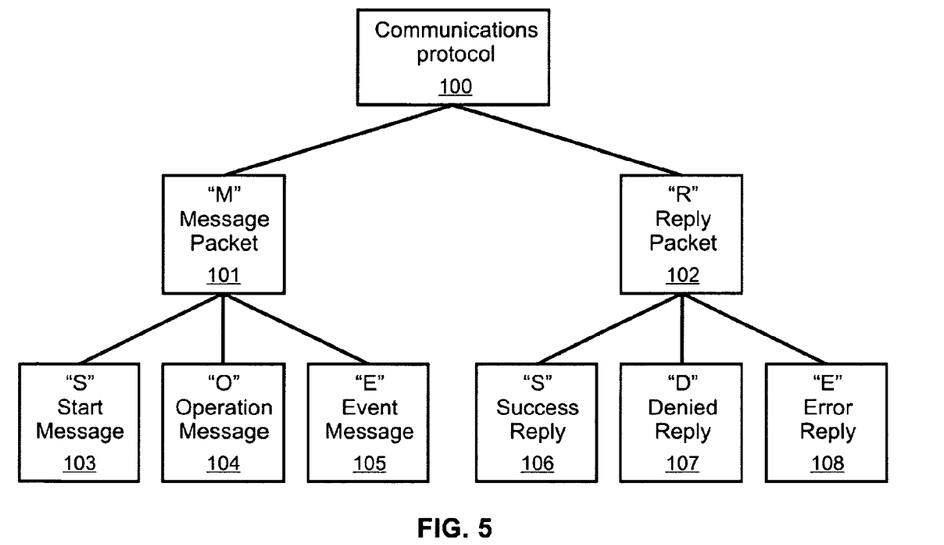
FIG. 5 is a schematic representation of a communications protocol according to the invention.

Classification of packets of the communications protocol according to the preferred embodiment of the invention is shown in FIG. 5. Communications protocol 100 uses packets of two types: message packets 101 identified by the "M" packet code, and reply packets 102 identified by the "R" packet code.

The structure of the message packet 101 according to the preferred embodiment of the invention is shown below.

| M/MESSAGE_ID/MESSAGE_CODE/ PARAMETER_1/.../PARAMETER_N |
|---|

According to the preferred embodiment of the invention, in the message packet 101 the code "M" is followed by the message_ID, which is a unique identification number of the message within established TCP/IP session. Message_code parameter is a single character that identifies the type of message: "S" for start messages 103, "O" for operation messages 104 and "E for event messages 105. Message code may be optionally followed by one or more parameters, as required by a particular message. Start and operation packets must be replied to. Event packets do not require any reply.

The structure of the reply message 102 according to the preferred embodiment of the invention is shown below.

| R/REPLY_ID/REPLY_CODE/PARAMETER_1/.../PARAMETER_N |
|---|

According to the preferred embodiment of the invention, in the reply packet 102 the code "R" is followed by the message_ID, which should be equal to the message ID of the message this reply is sent in response to. Reply_code parameter is a single character that indicates the status of the message execution. Available codes are "A" for "success" replies 106, "D" for "denied" replies 107, and "E" for "error" replies 108. The reply code may be optionally followed by one or more parameters, as required by a particular reply. A parameter can, for instance, comprise a data table representing current value of the property element that has been requested by the server.

After the communications link is established between the device and the server, the latter start the communications with the device by sending the start message 103. This message includes the version of the communications protocol supported by the server. If the device is capable of communicating using specified protocol version, the device replies with the "success" reply packet 106, otherwise the device replies with "denied" reply packet 107.

The structure of the operation message 104 according to the preferred embodiment of the invention is shown below.

| M/MESSAGE_ID/O/OPERATION/CONTEXT_NAME/ ELEMENT [/DATA_TABLE] |
|---|

According to the preferred embodiment of the invention, in the operation message 104 the code "M" is followed by the message ID, code "O" indicating that this is an operation message, and operation code. Operation code is a character specifying the operation to be executed. Available codes are: "G" for "get property" operation, "S" for "set property"

operation, "C" for "execute method" operation, "L" for "add event listener" operation, and "R" for "remove event listener" operation. Context_name field specifies the context on the device. Element field specifies a property, method, or event element that the operation must be performed on. Optional data_table field carries accompanying data when necessary. For example, for the "set property" operation, the data table will contain a new value of the property to be set.

"Get property" and "set property" operations are used for reading and writing the values of property elements of the device. "Execute method" operation causes the device to execute specified method. "Add event listener" operation informs the device that the server is interested in receiving event notifications for a specified event element. "Remove event listener" operation causes the device to stop sending specified event notifications to the server.

It has already been explained that the metadata of each particular context is stored in five read-only properties with predefined names. The server expects these five read-only properties to be available in each and every context and it is through these variables that the server "learns" about the contents of each context.

The structure of the event message 105 according to the preferred embodiment of the invention is shown below.

M//E/CONTEXT_NAME/EVENT_NAME/
EVENT_LEVEL/EVENT_ID [/DATA_TABLE]

According to the preferred embodiment of the invention, in the event message 105 the code "M" is followed by an empty message_id field. The field is empty because event messages do not require reply, and, hence, there will be no need to match reply to the command. Next field is "E" for "event message". This field is followed by the context_name field, which carries the name of the context in which this event notification was generated. Event_level field carries rough classification of the event according to its severity. Event_id field contains unique event indentificator. Optional data_table field supplies accompanying event data, if any.

It will be apparent to those skilled in the art that data formats described above can be altered in many ways without departing from the scope of the invention.

Data Cache

Central to the server operation is a device data cache that contains a local copy of metadata retrieved from the devices, as well as the copy of the values of all property elements of devices. This data is extracted from the devices by a so-called device controller module of the server software. Cached data is stored in the relational database that is usually located on the same computer that runs the server software. Alternatively, the database may reside on a different computer with which the server is able to maintain a substantially uninterrupted connection.

One of the operating principles of the system of the present invention is that neither the client software, nor the server software, except for the device controller module, interact with the devices directly. Rather, they access the metadata from the devices that is cached on the server. They also access and modify cached property values that are received from the devices. The device controller module of the server attempts to keep the cached data and the actual data of devices synchronized. Therefore, making changes to the values of property elements stored on the server will result in corresponding changes made to the property elements of device itself—when and if the device connects to the server.

Properties

Human monitoring and editing of the property elements are performed from the client. The user of the client software works with the copies of property elements stored in the server cache, and the device controller module of the server makes sure that the changes are made to the devices.

Cached copies of the values of the property elements are also manipulated by the server during so-called group operations, which will be described later. Additionally, the server also provides an auxiliary interface to third party software or systems that can use this interface to access and manipulate cached property values.

The central server can also contain additional plug-in software modules that control cached property values automatically, according to a predefined logic. In the preferred embodiment of the invention, the server is realized using JAVA programming language which allows quick creation and addition of software modules. Such plug-in modules can be designed according to the requirements of each particular system installation.

Regardless of which software component or external system is granted access to the property values, such control remains indirect and through the cached copy of these values. Devices do not need to be constantly connected to the server for such property value manipulation to take place.

Methods

Methods of a particular device can only be invoked when this device is connected to the server. Methods do not have any value associated with them, so only the metadata describing each method is stored in the server cache. Using this metadata, the party invoking the method can understand specifics of this method invocation, i.e. what input parameters, if any, this method requires, and what output result, if any, this method returns.

The list of parties that can invoke methods on the devices includes the client software, one of the own components of the server software, additional plug-in modules developed for a particular installation or use of the system, and third-party software or systems working through the auxiliary interface.

Handling Events

All event notifications generated by the device are first queued in this device's memory. When the device is connected to the server, the latter will fetch queued events from the device and store them in the relational database. Every fetched event is permanently deleted from the device queue.

Just as there is a level of indirection implemented between the property values and the parties manipulating these property values, event notifications are accessible to interested parties not directly but through this database.

The list of parties that can receive event notifications includes the client software, one of the own components of the server software, additional plug-in modules developed for a particular installation or use of the system, and third-party software or systems working through the auxiliary interface. To start receiving notifications for a particular kind of event the interested party has to first "subscribe" to the event.

This subscription process involves informing the server about the kind of events that the party wishes to monitor for, and the server taking decision on whether this party is allowed to receive requested notifications. For this, the server references the copy of the event metadata stored on the server. This metadata includes, among other parameters, a detailed description of the access rights to event notifications for this event.

Group Operations, Automation

One of the strongest aspects of the system of the present invention is the ability to perform group operations. Rather than dealing with each device separately, the user may select an appropriate group operation and let the server perform it on multiple devices. For example, in the preferred embodiment of the invention, the system has a copy operation which copies the values of property elements of one device to the corresponding property elements of several other devices.

Many additional useful features of the system may be implemented through automatic interaction between the server, devices, and cached data from the devices. For example, the server can be programmed to receive event notifications and invoke methods on devices in response to these notifications. Moreover, an event notification from one device can trigger a method invocation on another device, which once again highlights an advantage of having a central server in the system.

The present invention also anticipates so called action macros that are stored on the devices along with properties, methods, and events. Unlike methods, these macros are executed by the server at the request of the client who has access to the list of macros available for each device—again, through the copies of all macros stored in the server cache. Each macro can contain a complex sequence of steps involving property manipulation, method execution, as well as interaction with the user working through the client software. Once the user orders the execution of the macro, the server performs predetermined sequence of actions. Depending on the macro, in the cause of its execution, the user of the client may be shown dialog boxes, requested to input data, press a button, or perform some other interactive action. Macro steps are not necessarily executed in the linear fashion, the execution of the macro can branch according to the result of execution of the previous steps of the macro.

Other possible uses of group operations and server automation will also be apparent to those skilled in the art.

Interaction Between the Devices and the Server

Figure 6:
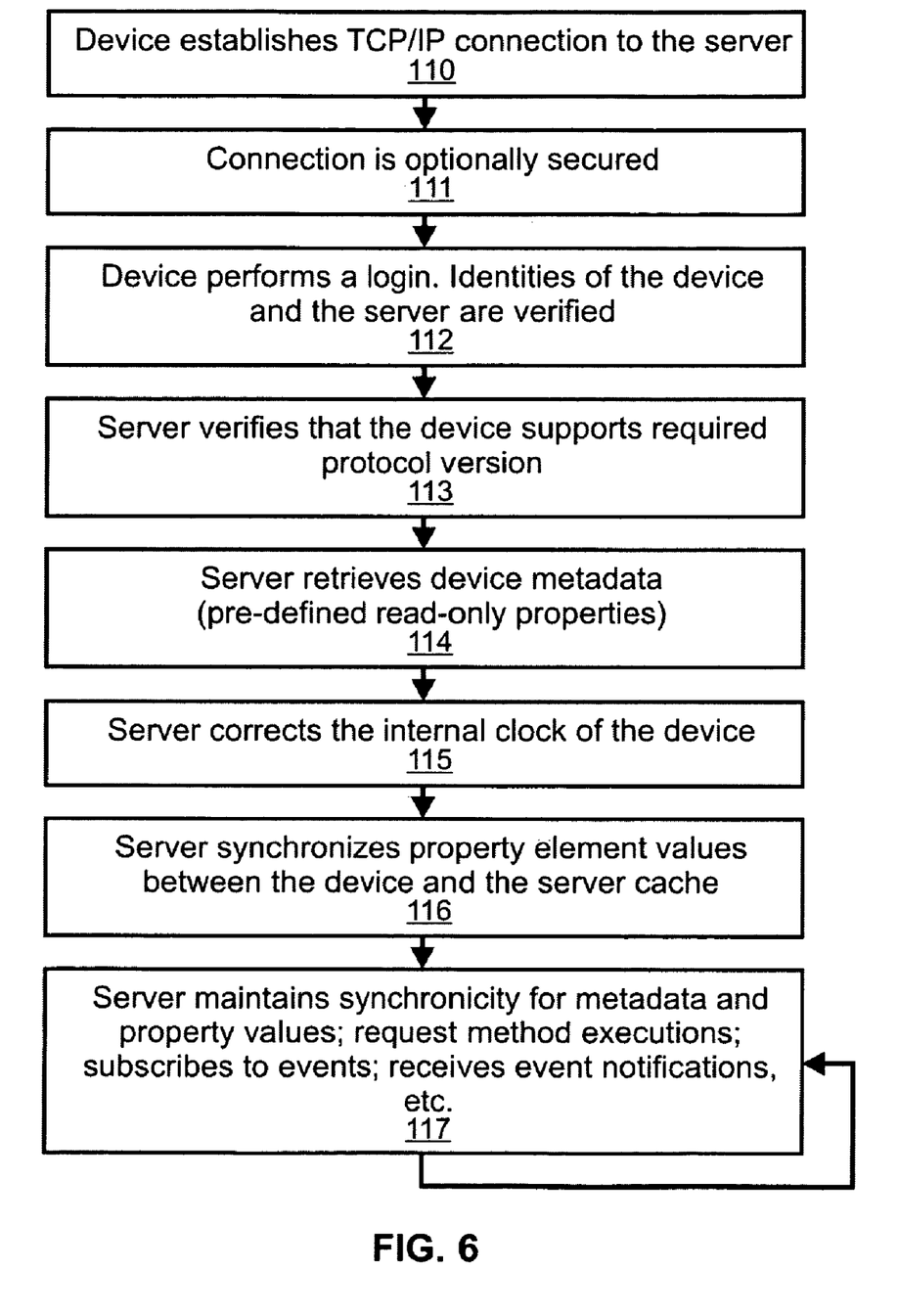
FIG. 6 is a flowchart depicting the interaction between the device and the server according to a method of the invention.

Interaction between the device and the server consists of a number of steps presented in FIG. 6.

The interaction starts at step 110 with the device establishing a TCP/IP connection to the server. In accordance with the logic of each particular device, this connection may be short-lived and exist only to exchange certain data with the server; or permanent and maintained sufficiently uninterrupted for as long as the device operates. Having the devices connect to the server, and not the other way around, achieves several important goals. Firstly, the devices do not need to be assigned a real IP-address since these devices are only establishing outgoing connections to the server, which typically results in the reduction of running cost and management effort associated with each device. Secondly, there is no need to configure a firewall on each device's side as all devices only establish outgoing connections. Thirdly, it becomes possible to interact with devices on cellular networks, such as GPRS, which do not allow incoming connections in principle. Finally, the server is spared from the necessity to "poll" the devices for availability. When a particular device comes online it manifests its presence by connecting to the server.

Next, at step 111, the device and the server optionally exchange necessary information to establish a secure encrypted communications link. In the preferred embodiment of the invention, this is achieved by using secure socket layer (SSL).

Once the link is established, the device performs a login sequence at step 112, during which the authenticity of both the device and the server are verified. This step is followed by the communications protocol handshake 113 that verifies that both the device and the server use a compatible version of the communications protocol.

Following these initial steps of connection establishment, the server starts retrieving device metadata from the device, which is shown as step 114. This metadata includes five pre-defined read-only properties described above.

After the device metadata is successfully received and stored on the server, the latter synchronizes the internal clock of the device with the server time at step 115. Following that, the server begins synchronization of the values of property elements between the device and the values of property elements cached on the server at step 116.

For each property element existing for the device the server takes an appropriate action according to the following rules. If the value of the property cached on the server matches the value of the same property on the device then no action is taken. If the value of the property was modified on the device but not on the server, the server fetches the new value and stores it in the server cache. If the value of the property was modified on the server but not on the device the server copies the value of the element from the server cache into the device. Finally, if both the server and the device values of the property have changed the server employs user-defined conflict resolution policy to determine a proper action.

Once the above steps have been completed, the device continues to be opened to server commands for as long as this device is connected to the server. This is depicted as step 117. Server commands may include instructions related to the manipulation of property elements, or commands to invoke a method. Server also "subscribes" and "un-subscribes" to event notifications of particular types. The device, in its turn, uses communications link established with the server to send to the server event notifications generated within the device.

It will be clear to one skilled in the art that the embodiments described above can be altered in many ways without departing from the scope of the invention. Accordingly, the scope of the invention should be determined by the following claims and their legal equivalents.

We claim:

1. A system comprising: a computer server, at least one device, said device having a controller, wherein said controller is adapted to perform a function; a computer network; wherein said device further comprises a network interface for communicating information between said device and said computer server over said computer network, said information conforming to a predefined communications protocol, and wherein said predefined communications protocol is used for at least one of either remote configuration, control, or monitoring of said device, and wherein said predefined communications protocol is adapted to recognize said device as a hierarchical tree of contexts, and wherein each context of the said tree of contexts comprises a set of data elements and metadata describing each said data element, and wherein said data elements of said devices can be accessed and manipulated from said computer server through said computer network using said communications protocol and wherein said computer server further comprises a logic circuit adapted to: exchange digital information between said devices and a database of said computer server, wherein said digital information is exchanged in accordance with said predefined communications protocol, store local copies of said metadata of each said context of each said device, and of values of each data element of the property type of each said device, wherein said local copies are stored on the computer server or on an external storage device with which said computer server is able to maintain a substantially uninterrupted communication over said computer network, cause said devices to execute said operations, and receive from said devices said event notifications and store said event notifications on said computer server or said external storage device.

2. The system recited in claim 1 wherein said system is adapted to synchronize the data between said local copies of the values of said data elements of property type and said device.

3. The system recited in claim 1 wherein said system is adapted to copy the data between said local copies of the values of said data elements of property type.

4. The system recited in claim 1 wherein said system is adapted to make said local copies of the values of said data elements of property type available to and accessible from other computer systems.

5. The system recited in claim 1 wherein said device comprises a sensor.

6. The system recited in claim 1 wherein said device comprises a controller for a motor vehicle.

7. The system recited in claim 6 wherein data represented by said data elements includes the data reflecting the location of said motor vehicle.

8. The system recited in claim 6 wherein the data represented by said data elements includes the data reflecting the speed of said motor vehicle.

9. The system recited in claim 6 wherein the data represented by said data elements includes an authorization code to operate said motor vehicle.

10. The system recited in claim 1 wherein said device comprises a device server connecting to said computer server a legacy device, said legacy device not having direct communications compatibility with said computer server, wherein said device server is externally connected to said legacy device and is configured to allow for the communications between said computer server and said legacy device.

11. The system recited in claim 1 wherein said device comprises a communications module connecting to said computer server a legacy device, said legacy device not having direct communications compatibility with said computer server, wherein said communications module is built into said legacy device and is configured to allow for the communications between said computer server and said legacy device.

12. The system recited in claim 1 wherein said communications network comprises a TCP/IP network.

13. The system recited in claim 12 wherein said TCP/IP network comprises an Ethernet network.

14. The system recited in claim 12 wherein said TCP/IP network comprises a wireless network.

15. The system recited in claim 14 wherein said wireless network comprises a Wi-Fi network.

16. The system recited in claim 14 wherein said wireless network comprises a WiMAX network.

17. The system recited in claim 14 wherein said wireless network comprises a cellular network.

18. The system recited in claim 17 wherein said cellular network comprises a GPRS network.

19. The system recited in claim 17 wherein said cellular network comprises an EDGE network.

20. The system recited in claim 1 wherein said device is configured for continuous communication with said computer server.

21. The system recited in claim 1 wherein said device is configured for intermittent communications with said computer server.

22. The system recited in claim 21 wherein said logic circuit of said device is configured to initiate communications with said computer server at predetermined time intervals.

23. The system as recited in claim 21 wherein said logic circuit of said device is configured to initiate communications with said computer server upon detecting a change in said device state or change in external or internal operating conditions of said device.

24. A system comprising: a computer server, at least one device, wherein each said device performs a function and each said device having a unique controller, wherein said controller is adapted to perform a function that is associated with said device; a computer network; wherein each said device further comprises a network interface for communicating information between said device and said computer server over said computer network, said information conforming to a predefined communications protocol, said communications protocol adapted to allow the device initiate an outgoing connection with said server, and for server to transmit command message packets and receive from said devices reply packets and event packets, and wherein said predefined communications protocol is used for at least one of either remote configuration, control, or monitoring of said device, and wherein said predefined communications protocol is adapted to recognize said device as a hierarchical tree of contexts, and wherein each context of the said tree of contexts comprises a set of data elements and metadata describing each said data element, and wherein said data elements of said devices can be accessed and manipulated from said computer server through said computer network using said communications protocol, and wherein each said data element conforms to a data element type selected from a set of data elements comprising: a property type for accessing operational variables, mode, or the state of said device, a method type for changing the operating state of said device or causing said device to execute a specified operation, and an event type for providing information on a new state of said device and changes in external or internal operating conditions registered by said device in the form of event notifications and wherein said computer server is connected to said computer network and is adapted to: exchange digital information between said devices and a database of said computer server, wherein said digital information is exchanged in accordance with said predefined communications protocol, store local copies of said metadata of each said context of each said device, and of the values of each data element of the property type of each said device, wherein said local copies are stored on said computer server or on external storage device with which said computer server is able to maintain a substantially uninterrupted communication over the computer network, cause said devices to execute said operations, and receive from said devices said event notifications and store said event notifications on said computer server or said second device.

25. The system recited in claim 24 wherein said adaption comprises software instructions written in JAVA programming language.

26. A method for monitoring a plurality of devices from a computer server via a computer network, each said devices having a unique controller adapted to perform a function, and said computer server and said devices utilizing a predefined communications protocol wherein said communications protocol adapted to allow said devices to initiate an outgoing connection with said server, and for server to transmit command message packets and receive from said devices reply packets and event packets, and said communications protocol further adapted for at least one of either remote configuration, control, or monitoring of said devices from said computer server, and wherein said predefined communications protocol represents each said device as a hierarchical tree of contexts, each said context comprising a set of data elements and metadata describing each said data element, and wherein said data elements can be accessed and manipulated through said communications protocol, and wherein said computer server is connected to said computer network and communicates with said devices using said predefined communications protocol, said method comprising: a step of storing a local copy of said metadata of each said context of each said device on said computer server or on a external storage device with which said computer server is able to maintain a substantially uninterrupted communication over said computer network, a step of storing a local copy of values of said data elements of property type on said computer server or said external storage device, a step of causing said devices to execute operations, and a step of receiving from said devices event notifications and storing said event notifications on said computer server or on said second computer.

27. A non-transitory computer-readable medium having recorded thereon a program for communicating with a plurality of devices over a computer network, said devices having a controller adapted to perform a function, and supporting a predefined communications protocol, said protocol adapted to allow said devices to initiate an outgoing connection with said server, and for server to transmit command message packets and receive from said devices reply packets aid event packets, and said communications protocol further adapted for at least one of either remote configuration, control, or monitoring of said devices, and wherein said communications protocol represents each said device as a hierarchical tree of contexts, each said context comprising a set of data elements and metadata describing each said data element, and wherein said data elements can be accessed and manipulated through said communications protocol, wherein said program enables a computer server to execute: a step of storing a local copy of said metadata of each said context of each said device on said computer server or on external storage device with which said computer server is able to maintain a substantially uninterrupted communication over said computer network, a step of storing a local copy of values of said data elements of property type on said computer server or said external storage device, a step of causing said devices to execute operations, and a step of receiving from said devices event notifications and storing said event notifications on said computer server or said second computer.

* * * * *